United States Patent
Fleissner

[15] 3,698,049
[45] Oct. 17, 1972

[54] APPARATUS FOR THE CONTINUOUS GASEOUS TREATMENT OF TEXTILE MATERIALS

[72] Inventor: Heinz Fleissner, Egelsbach near Frankfurt Main, Germany

[73] Assignee: Vepa AG, Basel/Schweiz, Germany

[22] Filed: Nov. 21, 1969

[21] Appl. No.: 877,564

Related U.S. Application Data

[60] Division of Ser. No. 831,686, July 9, 1968, Pat. No. 3,521,378, which is a continuation-in-part of Ser. No. 654,728, July 20, 1967, Pat. No. 3,503,134.

[30] Foreign Application Priority Data

| June 8, 1968 | Germany | P 17 60 604.1 |
| June 22, 1968 | Germany | P 17 60 717.9 |
| June 27, 1968 | Germany | P 17 60 751.1 |
| April 8, 1969 | Germany | P 19 17 757.2 |

[52] U.S. Cl. .................. 26/60, 26/18.5, 26/68, 34/115, 34/120, 68/DIG. 5
[51] Int. Cl. ......... D06c 3/02, F26b 3/06, F26b 13/30
[58] Field of Search ..... 34/115, 120; 26/18.5, 52, 60, 26/61 A, 62 A, 68; 68/DIG. 5

[56] References Cited

UNITED STATES PATENTS

| 3,021,607 | 2/1962 | Fleissner | 68/DIG. 5 UX |
| 3,242,702 | 3/1966 | Fleissner | 68/DIG. 5 UX |
| 380,139 | 3/1888 | Scholfield | 26/60 |
| 408,492 | 8/1889 | Lindley | 26/52 UX |
| 1,786,031 | 12/1930 | Scott | 26/61 A UX |
| 1,978,341 | 10/1934 | Coleman | 26/68 UX |
| 2,219,213 | 10/1940 | Swain | 26/60 X |
| 2,450,022 | 9/1948 | Schreiner | 26/52 X |

FOREIGN PATENTS OR APPLICATIONS

| 506,798 | 4/1952 | Belgium | 26/18.5 |
| 1,345,292 | 10/1963 | France | 34/115 |
| 382 | 1864 | Great Britain | 26/61 A |
| 1,011,424 | 12/1965 | Great Britain | 34/115 |
| 400,072 | 4/1966 | Switzerland | 26/52 |

Primary Examiner—Robert R. Mackey
Attorney—Craig, Antonelli and Hill

[57] ABSTRACT

The present disclosure is directed to apparatus for the treatment of materials which comprises a heat-insulated housing divided into a circulation chamber and a treatment chamber, a plurality of sieve drum means subjected to a suction draft rotatably disposed within said treatment chamber, fan means associated with the sieve drum means for producing a suction draft and for circulating the treatment medium in said treatment chamber, heating means provided in the circulation zone of the treatment medium, perforated conveying means cooperating with the sieve drum means for the effective conveyance of the material being treated by free fall to said sieve drum means, and additional perforated conveying means disposed below the sieve drum means for guiding the material to outlet means for discharging the material being treated from the treatment chamber.

4 Claims, 3 Drawing Figures

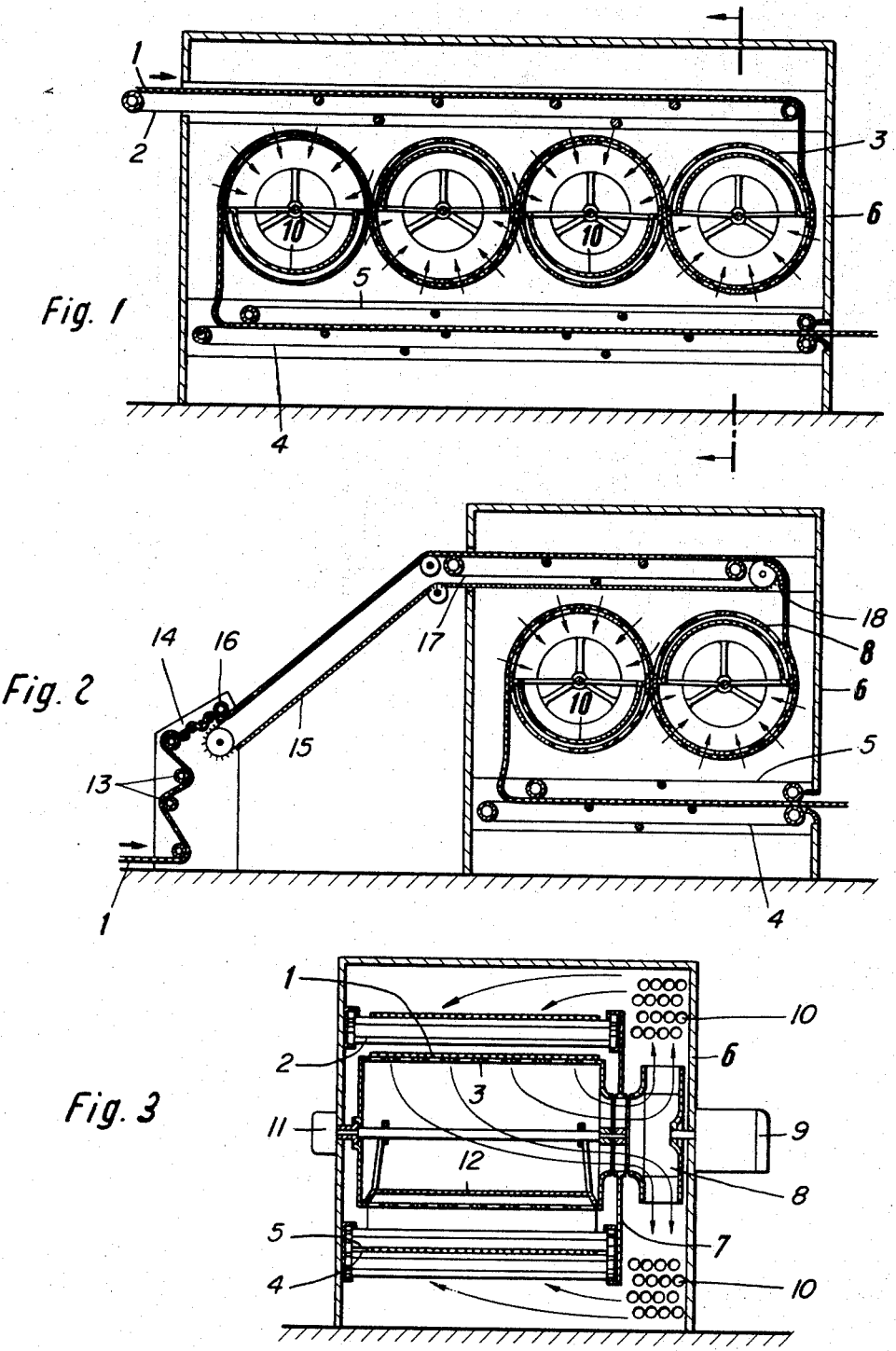

APPARATUS FOR THE CONTINUOUS GASEOUS TREATMENT OF TEXTILE MATERIALS

CROSS-REFERENCE TO RELATED APPLICATIONS

This is a division of application Ser. No. 831,686 filed on July 9, 1968 and now U.S. Pat. No. 3,521,378 granted on July 21, 1970; which application is a continuation-in-part of application Ser. No. 654,728, filed July 20, 1967, and now U.S. Pat. No. 3,503,134 granted on Mar. 31, 1970.

BACKGROUND OF THE INVENTION

This invention relates to apparatus for the treatment, e.g. drying, steaming, fixing, condensing and the like, of materials, particularly textile materials, such as cloth, knit fabrics, composite fiber materials, tufted goods, etc., by utilizing a gaseous treatment medium, for example air, steam, or steam-air mixtures. The apparatus of the present invention includes a heat-insulated housing containing as the conveying means at least one sieve means subjected to a suction draft, preferably a perforated sieve drum means, and one or more fan means for the generation of said suction draft and for the purposes of circulating the treatment medium. A heating means is also provided for heating the treatment medium.

It is known to combine devices of this type with a tentering device in such a manner that the material is guided, while being stretched along its width, directly up to the placement or transfer of said material to the conveying means subjected to a suction draft. Such a guidance of the material preliminary to its introduction onto a conveying means subjected to a suction draft exhibits the advantage that the width of the wide-stretched material is substantially retained by the suction draft and thus is prevented from shrinking.

The utilization of the throughflow principle and the conveyance on perforated sieve conveying means during the treatment affords considerable advantages as compared to a sole tenter frame treatment. The particular advantages of the throughflow principle include extremely brief treatment times and an extremely uniform treatment effect. By placing the material on sieve means during the treatment process, a more uniform character of the materials is obtained, particularly in the case of fixing treatments and generally in the case of treating mesh material. By the utilization of a tentering station, the material can be prestretched to a specific width. Furthermore, spin folds (creases) can also be substantially eliminated, and a good shrinkage of the material can be achieved, for example, by steaming of the material in the tentering zone.

One of the problems encountered in the use of tentering devices is that the material sags between the tentering chains. This can promote the formation of arcs in case of treating very wide webs of material tending toward arc formation. Also, the tensile forces are correspondingly high when treating wet textile material, especially in the case of thick goods such as tufted rugs and stitched felts. In the case of wide webs of material, it is very difficult to fully eliminate oblique distortion and arcs solely by the chains of the tenter station, that is, by temporarily having one chain lead or lag behind with respect to the other chain. Also, in the case of sensitive knit fabric webs having a width of about 3 meters, and more, a sagging of the material is disadvantageous since as a result, the loops or stitches in the marginal zones are stretched out of shape more readily and to a greater degree than those in the central zone.

In connection with tentering stations, it is conventional to dispose cords or pipes between the tentering chains, on which elements the material rests and thus is prevented from sagging. However, such an arrangement of stationary supporting units is undesirable since the material slides along these stationary elements and thus is braked. The disadvantage of arc formation as a consequence of structural changes in the marginal zone also occurs in this arrangement and even to an increased extent.

In order to eliminate the spin creases, and in order to stretch the material to a specific width, a certain length of the tentering station is required, for example, at least about 4 meters, or more. The longer the tentering station, the more favorably affected is the material. However, lengthening the tentering station is expensive and in addition produces the disadvantage that the space requirements become correspondingly larger. In general, only a limited space is available for such treatment plants. Therefore, it is desired to keep the plant as short in length as possible. By employing the perforated drum principle, a shortening of the treatment time and thus also a shortening of the length of the treatment plant can be achieved. However, in the case of treating various materials which tend to shrink substantially in fiber fixing processes, the suction draft of the perforated drum alone is insufficient for preventing these materials from shrinking in their width. For example, fabrics and textile webs of polypropylene exhibit a higher shrinking capacity. Thus, it is advantageous for textile webs which tend to shrink greatly to be heated to the treatment temperature while they are still held in the tentering chains of the tentering zone, that is, before they are freely guided onto the surfaces of perforated sieve drums subjected to a suction draft.

SUMMARY OF THE INVENTION

The object of the present invention is to avoid the prior art disadvantages in the treatment of textile materials.

Another object of the present invention is to provide an improved apparatus for the treatment of textile materials wherein the material being treated is guided through the apparatus in a distortion-free manner.

A further object of the present invention is to provide an improved apparatus for the treatment of textile materials wherein a substantial reduction in apparatus cost and space can be achieved thereby making the present system economically advantageous.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages maybe eliminated and a much improved apparatus for the treatment of textile materials may be obtained by providing at least one endless supporting element associated with the tentering device, which travels along with said tentering device. The supporting elements, according to one embodiment of the present invention, can consist of cords or strings (bands or belt) spaced at mutual distances from each other. In this connection, it is advantageous to arrange the cords or strings on the side carrying the material, and at a slight angle with respect to each other in the direction of travel, in such a manner that the strings preferably diverge from one another, as seen in the direction of travel. Another desirable arrangement results by disposing a broad supporting band between the tentering chains. In this connection, the supporting band (belt) is arranged at the level of the tentering plane or slightly therebelow. The arrangement of supporting elements affords the further advantage that said elements can be additionally conducted, at least partially, above a perforated drum, and thus the material being treated is held between the perforated drum and the supporting elements during the heating-up procedure.

The provision of using a supporting element between the tentering chains exhibits the additional advantage that said element can temporarily be driven faster or more slowly by the interposition of an appropriate gear, and thus can be employed to compensate for arc distortions in the material.

The use of a supporting element, particularly a band-shaped supporting element, makes it additionally possible, according to the present invention, to utilize the apparatus in a substantially more versatile manner. Thus, it is possible to employ the present apparatus for treating tubular materials, as well as for fluffy goods and for multi-web operation, if the supporting element is arranged and correspondingly constructed to order to serve as the inlet for these materials. Apparatus with versatile application is of great importance, particularly with small companies and in the case of contractors, since in such cases, due to the large capacity of the perforated drum devices, all existing types of materials can be treated thereon.

According to another embodiment of the present invention, a particularly compact structure can be obtained by extending the tentering elements of the tentering station and/or the perforated band above all perforated drums to the rearmost perforated drum, so that these elements and/or the band transfer the material onto this drum since it is thereby possible to pretreat the materials while it is simultaneously being conveyed on the tentering chains and/or on the perforated band.

In case such devices are to be incorporated into a continuous plant, it is advantageous to associate a further conveying element, for example, at least one additional perforated band and/or tentering element with the perforated drums. This is done by providing said additional conveying element on the opposite side from the tentering station and/or the perforated band serving as the inlet. This produces in the treatment chamber a meander-shaped or S-shaped path of the material, the material inlet and the material outlet being disposed at opposite ends of the apparatus. This space-saving construction is also desirable for treating materials which do not shrink during the treatment process. For such goods, the conveying elements of the inlet can be disposed above the perforated drum in such a manner that the material arrives at the receiving perforated drum by free fall, and the additional conveying elements disposed beneath the perforated drums are arranged in such a manner that the material arrives by free fall from the delivering perforated drum to these conveying elements, represented, for example, by a perforated band. Such an arrangement exhibits the advantage that all of the drums have the same diameter and the material travels automatically through the treatment chamber even at the commencement of the operation of the plant.

In the case of woven and knitted materials, for example polyamide, which are to be stretched in their widths during the treatment, and which tend to shrink during the heat-treatment, it is advantageous to heat these materials to a substantial extent in the tentering station where they are held in the tentering chains.

In order to prevent light-weight textile materials from being blown upwardly by the circulating treatment medium, it is proposed to hold the material, after it has been conveyed over the perforated drums, between two perforated bands and thus conduct the material through the circulating treatment medium in the housing, at least up to the outlet of the apparatus.

In order to obtain optimum efficiency on each perforated drum in connection with the material being treated, it is suggested to associate a cover with the sieve drum subjected to a suction draft. This cover selectively shields a portion of the drum from the suction draft or alternatively releases the suction draft in this zone. The cover can be disposed on the inside of the perforated sieve drum and can be pivotably mounted. However, it is also possible to produce such a cover from two perforated or slotted metal sheets, at least one of which is displacable with respect to the other to such an extent that the perforations of the two metal sheets coincide or are offset with respect to each other. These metal sheets can be provided within the perforated drum as well as on the outside of said drum. In general, said metal sheets are adapted to the curvature of the perforated drum.

By means of the above-mentioned features, an apparatus is obtained which can be utilized in a very versatile manner. Such a versatility is extremely important for smaller firms and for companies which must be able to treat all types of materials encountered on such an apparatus in order to be able to fully utilize the large capacity of a perforated drum plant.

BRIEF DESCRIPTION OF THE DRAWINGS

The present invention will become more fully understood from the detailed description given hereinbelow on the accompanying drawings which are given by way of illustration only and thus are not limitative of the present invention and wherein, FIG. 1 shows an apparatus for the continuous treatment of textile material with gas including a plurality of perforated sieve drum means in a longitudinal section view;

FIG. 2 shows another embodiment of the apparatus shown in FIG. 1 wherein a tentering station is employed; and FIG. 3 shows a cross sectional view through the device of FIG. 1.

DESCRIPTION OF THE PREFERRED EMBODIMENTS

The apparatus of FIG. 1 is intended for the treatment of materials, which, during the treatment process to which they are subjected, do not shrink at all, or only to a minor extent. For this reason, no tentering device is provided, but rather only an inlet belt 2 which is perforated. The web-shaped material 1 passes from the perforated inlet belt by free fall onto the perforated drums 3 disposed therebelow, and from there, again by free fall, to a further perforated belt 4, which is associated with another perforated belt 5 as the cover belt therefor. Thus, the material 1 is conveyed to the outlet by being guided between the perforated belts 4 and 5 beneath the perforated sieve drums.

The cross section of this apparatus is illustrated in FIG. 3. As can be seen therefrom, the internal space of the heat-insulated housing 6 is subdivided by a wall 7 into a heating chamber and a treatment chamber. Each perforated drum 3 is associated with a radial-flow fan 8, disposed at the front end of the drum. The drive 9 for the fan is attached at the outside of housing 6. Heating units 10 are provided in the fan chamber above and below the fan 8. The drive 11 for the perforated drum 3 is mounted on the other side of the housing and each perforated drum contains a cover or baffle member 12 which interrupts the suction draft at this side of the sieve drum.

The apparatus of FIG. 2 is similarly constructed as the apparatus of FIG. 1, with the exception that in this embodiment, tentering means are provided in place of an inlet belt 2. The web-shaped material 1 is guided with spreader rolls 13 to the inlet of a tentering station 14, where it is attached to the pin chains 15 by way of brush rollers 16. A supporting belt 17 is associated with these chains in the treatment chamber. By means of unpinning transfer elements 18, the textile web 1 is removed from the pins in the reversing zone of the tentering chains 15 and passes, in free fall, onto a perforated drum 3. The subsequent travel of the material corresponds exactly to that of FIG. 1.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for the continuous treatment of textile materials with a gaseous treatment medium, which comprises a heat-insulated housing; baffle means in said housing for dividing the housing into a treatment chamber and a circulation chamber for the gaseous treatment medium; a plurality of sieve drum means subjected to a suction draft rotatably disposed within said treatment chamber; fan means associated with the sieve drum means for producing the suction draft and for circulating the treatment medium through said treatment chamber and through said circulation chamber; heating means provided in the circulation chamber for heating the treatment medium circulated therethrough; a first perforated conveyor belt extending into the treatment chamber over the plurality of sieve drum means for introducing the textile material to be treated into the treatment chamber; a second perforated conveyor belt disposed in the treatment chamber extending under the plurality of sieve drum means and a third perforated conveyor belt disposed in the treatment chamber extending below the plurality of sieve drum means and above the second perforated conveyor belt; said textile material passing from said first perforated conveyor belt by free fall onto the initial material receiving sieve drum means, passing over portions of each of the successive sieve drum means, and then passing from the last material receiving drum means by free fall to the second perforated conveyor belt whereby said textile material is continuously subjected to said circulating treatment medium; said third perforated conveyor belt acting together with said second perforated conveyor belt to guide the material beneath the sieve drum means and to prevent the material from lifting from said second perforated conveyor belt; and outlet means through which the material being treated is discharged from the treatment chamber.

2. The apparatus of claim 1, in which the first perforated conveyor belt is operatively associated with a tentering means provided with tensioning chains and pins for engaging said material.

3. The apparatus of claim 2, in which an unpinning transfer means is associated with the tensioning chains for removing the material being treated from the pins of said chains and for allowing the material to pass by free fall onto the initial sieve drum means.

4. The apparatus of claim 1, in which the plurality of sieve drum means are arranged in a single row within said treatment chamber.

* * * * *